United States Patent
Hoshyar et al.

(10) Patent No.: US 9,397,824 B1
(45) Date of Patent: Jul. 19, 2016

(54) GEAR SHIFTING FROM BINARY PHASE DETECTOR TO PAM PHASE DETECTOR IN CDR ARCHITECTURE

(71) Applicant: Texas Instruments Incorporated, Dallas, TX (US)

(72) Inventors: Reza Hoshyar, San Jose, CA (US); Kevin Zheng, Alhambra, CA (US); Nirmal Warke, Saratoga, CA (US); Ali Kiaei, San Jose, CA (US); Ahmad Bahai, Lafayette, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/686,203

(22) Filed: Apr. 14, 2015

Related U.S. Application Data

(60) Provisional application No. 62/108,790, filed on Jan. 28, 2015, provisional application No. 62/108,796, filed on Jan. 28, 2015.

(51) Int. Cl.
| | |
|---|---|
| *H04L 27/00* | (2006.01) |
| *H04L 7/04* | (2006.01) |
| *H04L 7/00* | (2006.01) |
| *H04L 25/03* | (2006.01) |

(52) U.S. Cl.
CPC .............. *H04L 7/042* (2013.01); *H04L 7/0087* (2013.01); *H04L 25/03273* (2013.01)

(58) Field of Classification Search
CPC .. H04L 7/042; H04L 7/0087; H04L 25/03273
See application file for complete search history.

(56) References Cited

U.S. PATENT DOCUMENTS

| | | | |
|---|---|---|---|
| 5,012,494 A | 4/1991 | Lai et al. | |
| 6,985,552 B1 * | 1/2006 | King | H03M 5/14 375/376 |
| 7,505,541 B1 * | 3/2009 | Brunn | H03D 13/003 375/360 |
| 8,428,113 B1 | 4/2013 | Katic et al. | |
| 2004/0258188 A1 | 12/2004 | Kim et al. | |
| 2005/0175080 A1 * | 8/2005 | Bouillett | H04L 25/03019 375/229 |
| 2005/0201491 A1 * | 9/2005 | Wei | H04L 7/0337 375/326 |
| 2009/0161747 A1 | 6/2009 | Aziz et al. | |
| 2010/0027709 A1 | 2/2010 | Kim et al. | |
| 2013/0243107 A1 * | 9/2013 | Chmelar | H04L 25/03057 375/259 |
| 2014/0169440 A1 * | 6/2014 | Kotagiri | H04L 25/063 375/233 |

OTHER PUBLICATIONS

International Search Report for PCT/US2016/015262 dated May 5, 2016; 2 pages.

* cited by examiner

*Primary Examiner* — Dac Ha
(74) *Attorney, Agent, or Firm* — John R. Pessetto; Frank D. Cimino

(57) ABSTRACT

A device and method for providing clock data recovery (CDR) in a receiver is disclosed. The method comprises receiving a Phase Amplitude Modulation (PAM) signal; on startup, using a non-return-to-zero (NRZ)-based phase frequency detector (PFD) to acquire signal frequency from the received PAM signal; and responsive to a determination, switching to a PAM phase detector (PD) for steady state operation.

12 Claims, 7 Drawing Sheets

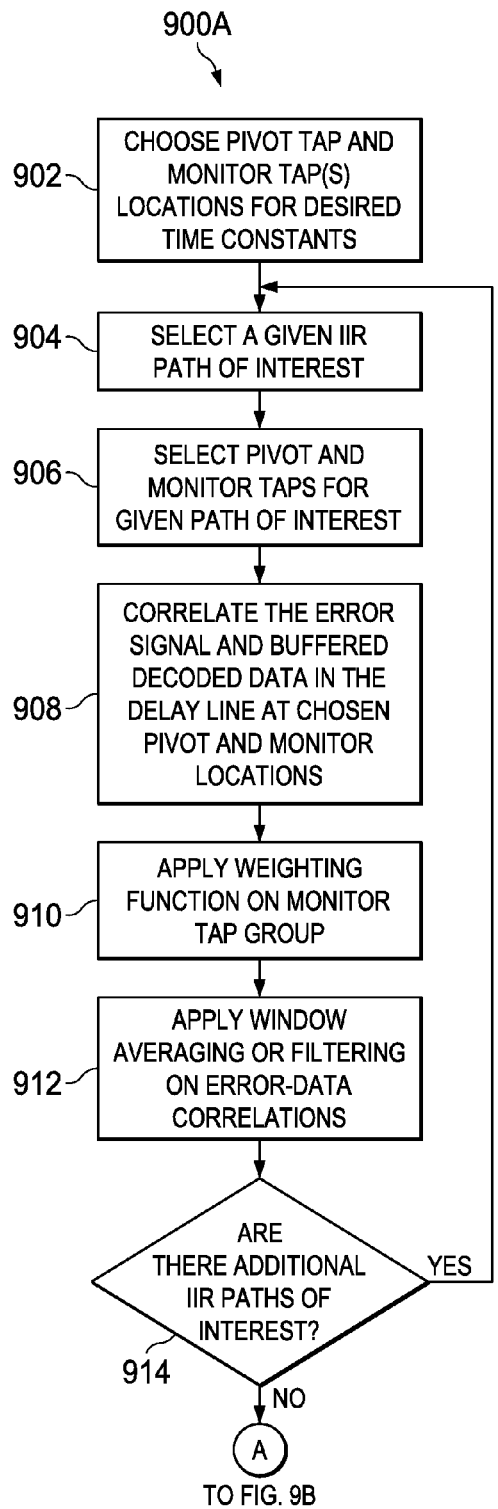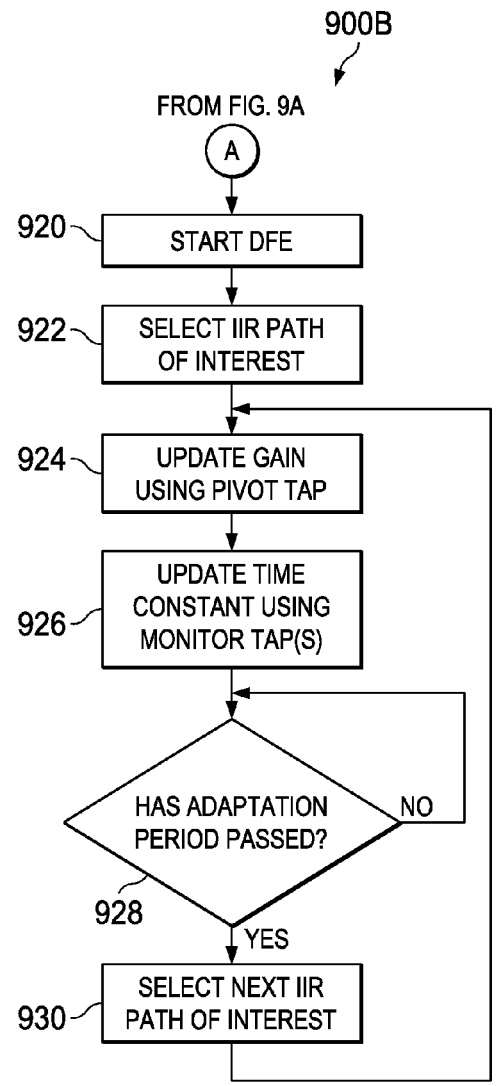
FIG. 9A
FIG. 9B

GEAR SHIFTING FROM BINARY PHASE DETECTOR TO PAM PHASE DETECTOR IN CDR ARCHITECTURE

CLAIM OF PRIORITY AND RELATED PATENT APPLICATIONS

This non-provisional application claims priority to (i) "GEAR SHIFTING FROM BINARY PHASE DETECTOR TO PAM PHASE DETECTOR IN POTTBÄCKER CDR ARCHITECTURE," Application No. 62/108,790, filed Jan. 28, 2015, in the name(s) of Reza Hoshyar, Kevin Zheng, Nirmal Warke, Ali Kiaei, and Ahmad Bahai; and (ii) "CTLE GEAR SHIFTING TO ENABLE CDR FREQUENCY LOCK IN WIRED COMMUNICATION," Application No.: 62/108,796, filed Jan. 28, 2015, in the name(s) of Reza Hoshyar, Kevin Zheng, Nirmal Warke, Wenting Zhou, Ali Kiaei, and Ahmad Bahai; each of which is hereby incorporated by reference in its entirety.

FIELD OF THE DISCLOSURE

Disclosed embodiments relate generally to the field of signal processing in wired communications. The embodiments of the present application relate to clock data recovery in systems with no high precision clock source at the receiver, commonly known as reference-less clock systems.

BACKGROUND

In wired communication the clock, i.e., the timing information, is extracted from the received data signal, including both frequency and phase of the clock. The function that extracts clock and timing information from the received data signal is commonly known as clock and data recovery (CDR). In applications where provision of an accurate clock is not affordable, the initial frequency of the receiver can be substantially far from the clock frequency used for the transmission of data. This is commonly known as reference-less clock operation as the receiver lacks a reliable and accurate source of clock. In this case, frequency locking becomes a difficult and important task. One efficient method for reference-less clock operation is the Pottbäcker scheme. This scheme uses a binary phase-frequency detector (PFD) that helps to bring its phase locked loop (PLL) into frequency-phase lock. The employed PFD is designed for binary non-return-to-zero (NRZ) signals.

There are applications in which multilevel signaling like PAM4, PAM8 and so on has proven to be advantageous over binary NRZ in terms of increased reach, i.e. longer cable, improved data rate, and/or reduced consumed power. However, such an increase in the number of signal levels effectively causes a wider span of zero-crossing points in the received data signal. This in turn causes degradation in PFD performance as it is solely relying on cleanness of the signal in its zero-crossing points. Despite this degradation, the NRZ based PFD is still useful in a Pottbäcker scheme and provides frequency locking, albeit at a slower rate. However after frequency lock, the NRZ based PFD has unsatisfactory performance in phase tracking and leaves a large amount of clock jitter, which substantially reduces the steady state performance of the receiver.

SUMMARY

The present patent application discloses methods and devices for using a multilevel-signal-based phase detector, referred to herein as a PAM phase detector or PAMPD. PAMPD requires reliably decoded data to operate. By knowing the data, PAMPD is able to properly exploit different multilevel data transitions and to extract far better timing information compared to the NRZ-based PFD used in a Pottbäcker scheme. However PAMPD cannot be used in the frequency acquisition phase due to the lack of reliably decoded data at the receiver in this phase. After locking frequency by the conventional Pottbäcker scheme, the disclosed method continues using Pottbäcker's NRZ-based phase-frequency detector while monitoring the reliability of the decoded data. The data reliability can be checked by an eye-height monitoring method. After ensuring that the data is being reliably decoded, the method switches to PAMPD for steady-state operation. This reduces clock jitter to a satisfactory level in steady state operation, thanks to the better performance of PAMPD.

In one aspect, an embodiment of a method for providing clock data recovery (CDR) in a receiver with no reference clock is disclosed. The method comprises receiving a Phase Amplitude Modulation (PAM) signal; on startup, using a non-return-to-zero (NRZ)-based phase frequency detector (PFD) to acquire a frequency from the received PAM signal; and responsive to a determination, switching to a PAM phase detector (PD) for steady state operation of the CDR module.

In another aspect, an embodiment of a clock data recovery (CDR) module is disclosed. The CDR module comprises a non-return-to-zero (NRZ)-based pulse frequency detector (PFD); and a PAM phase detector (PAMPD), wherein the CDR module initiates phase and frequency acquisition using the NRZ-based PFD and responsive to a determination, switches to PAMPD for steady state operation.

In yet another aspect, an embodiment of a receiver is disclosed. The reference-less receiver comprises a linear equalizer connected to provide a first signal, the first signal comprising a received PAM signal that has been equalized; a decision feedback equalizer (DFE) connected to receive the first signal and to provide a second signal and a third signal, the second signal comprising the first signal summed with a correction and the third signal comprising recognized PAM data; and a clock data recovery (CDR) module comprising a non-return-to-zero (NRZ)-based pulse frequency detector (PFD) and a PAM phase detector (PAMPD), the CDR module being connected to receive the first, second and third signals; wherein the CDR module initiates phase and frequency acquisition using the NRZ-based PFD and responsive to a determination, switches to PAMPD for steady state operation.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 9A and 9B depicts flowcharts of a method for adapting a mixed signal IIR DFE using pivot taps and monitor taps;

DETAILED DESCRIPTION OF THE DRAWINGS

Specific embodiments of the invention will now be described in detail with reference to the accompanying Figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

Figure 11:
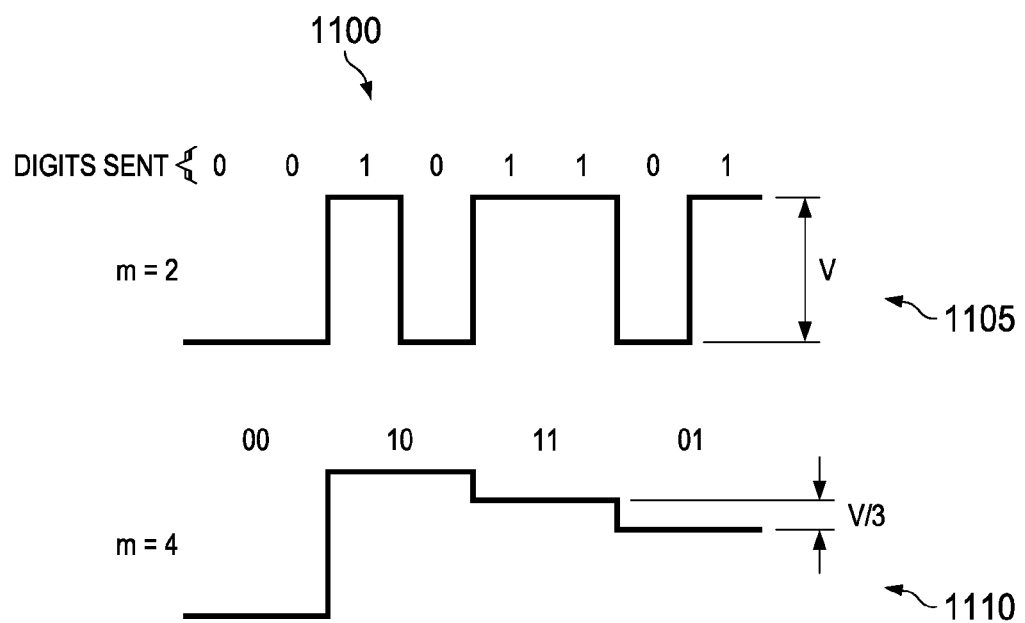
FIG. 11 depicts a comparison between a binary non-return to zero signal and a PAM4 signal.

Referring now to the drawings and initially to FIG. 11, illustration 1100 demonstrates a comparison between a binary Non-Return to Zero (NRZ) signal 1105 and a multi-level signal 1110, which in this illustration is a PAM4 signal. Across the top of this figure is a copy of the binary digits that are being sent, i.e., the "0"s and "1"s that are represented by the signal. Binary NRZ code 1105 represents each "1" by a first condition, e.g., +1 volts, and represents each "0" by a second condition, e.g., −1 volts. There is no neutral or rest condition. In the PAM4 signal 1110, each two-bit combination of symbols is represented by one of four signal levels. As shown in this example, PAM 4 can represent "00" as −1 volts, "10" as +1 volts, "11" as +⅓ volts, and "01" as −⅓ volts.

Figure 1:
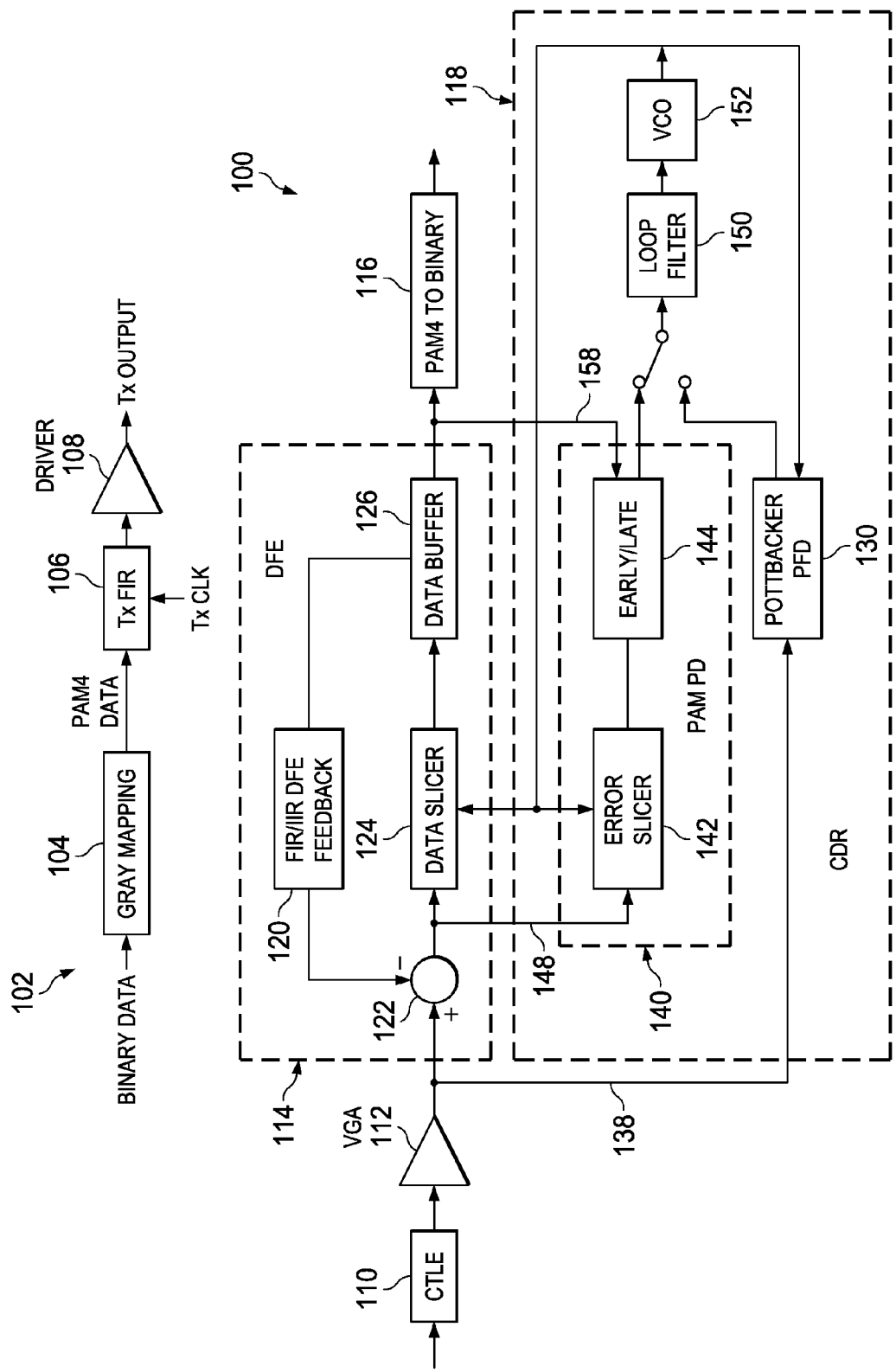
FIG. 1 depicts a transmitter and receiver architecture that uses multilevel signals for transmission according to an embodiment of the disclosure.

Referring now to FIG. 1, this figure depicts a transmitter and receiver architecture that uses multilevel signals for transmission according to an embodiment of the disclosure. In this example, the multilevel signaling is PAM4. At Transmitter 102, binary data is received at gray mapping 104, which recodes the binary data to PAM4 data. Other mappings from bits to symbols are also possible and Gray mapping is just one example. However this mapping is found to be efficient for line signaling as it results in the least bit error rate (BER) for a given symbol error rate (SER). Finite impulse response (FIR) 106, which provides pre-emphasis to the signal to cancel pre-cursor inter-signal interference (ISO, is connected between gray mapping 104 and driver 108, which transmits the signal. At receiver 100, continuous time linear equalizer (CTLE) 110, which receives the signal, is connected to provide the signal to voltage gain amplifier (VGA) 112. The signal traverses decision feedback equalizer (DFE) 114 and is passed to PAM4-to-binary converter 116, while clock data recovery (CDR) 118 recovers a clock signal from the received signal to provide clocking to the receiver.

As further shown in this figure, within DFE 114 are data slicers 124, which are connected between adder 122 and data buffer 126. Finite impulse response (FIR)/infinite impulse response (IIR) DFE feedback 120 provides a feedback loop from data buffers 126 to adder 122. CDR 118 includes Pottbäcker phase frequency detector (PFD) 130, which is connected between VGA 112 and loop filter 150, and pulse amplitude modulation phase detector (PAMPD) 140, which is connected between a point between adder 122 and data slicers 124 and loop filter 150. PAMPD 140 includes error slicers 142, which are connected between the input signal and early/late detectors 144. Loop filter 150 is switchably connected between one of Pottbäcker PFD 130 and PAMPD 140 and voltage controlled oscillator 152, which provides clocking signals to both PAMPD 140 and DFE 114. It will be understood that other elements of these modules can be present, but are not shown for ease of understanding. In general, CTLE 110 is used to flatten the spectral content of its output signal by amplifying the spectral portions of the received signal that have experienced more loss propagating through the channel, VGA 112 amplifies the signal, and DFE 114 performs filtering to remove post-cursor ISI from the signal for improved recognition of the data. PAM4-to-binary 116 then converts the received signal back to binary for use. The present patent application discloses innovations to CDR 118, CTLE 110 and DFE 114, each of which will be discussed in greater detail below. It should be understood that while these modules are shown operating in an interconnected fashion, the innovative concepts herein are not limited to the specific combinations disclosed. Each disclosed module can be used in other combinations to provide some or all or the disclosed benefits. In at least one embodiment, the system of FIG. 1 can be provided in a 64 nm CMOS process.

Gear Shifting from Pottbäcker to PAMPD

Figure 2A:
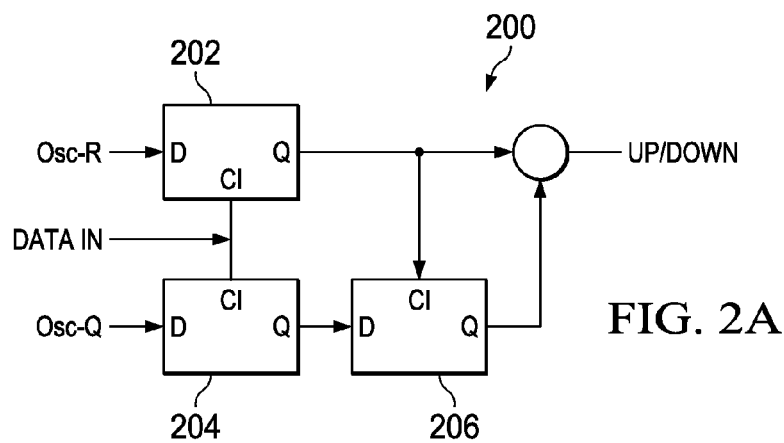
FIGS. 2A and 2B depict block diagrams of a Pottbäcker PFD that can be used in an embodiment of the disclosure.

We turn first to look more closely at clock data recovery (CDR) 118. CDR 118 contains two primary components: an NRZ-based phase frequency detector (PFD) 130, which in the disclosed embodiment is a Pottbäcker PFD, and pulse amplitude modulation phase detector (PAMPD) 140, both of which are known circuits. An implementation of each is shown herein for completeness, but one skilled in the art will understand that the exact implementation is not important to the disclosed improvements and other implementations are possible. Although this circuit will be described herein with regard to a Pottbäcker PFD, one skilled in the art will realize that other NRZ-based PFD can also be utilized. When a signal is first received at receiver 100, Pottbäcker PFD 130 is used initially to acquire a frequency lock. FIG. 2A shows a block diagram of Pottbäcker PFD 130, which includes three D flip-flops 202, 204, 206. Flip-flop 202 receives the clock signal from VCO 152 as input Osc-I Flip-flop 204 receives the same signal at an offset of 90° as input Osc-Q; both flip-flops are clocked by the incoming data. Flip-flop 202 will sample the zero-crossing of VCO 152 on both edges and, in lock, will oscillate between +1 and −1. Flip-flop 204 samples the peak of VCO 150 when in lock and has an output therefore that is always a 1. When the frequency of VCO 152 is greater than the frequency of the data, the output of Flip-flop 202 leads the output of Flip-flop 204. The opposite is true when the frequency of VCO 152 is less than the frequency of the data. Flip-flop 206, which is connected to receive the output of both Flip-flop 202 and Flip-flop 204, determines which state is true; its output is zero if sampled Qout is a 1; if sampled Qout is a zero, i.e. a cycle slip occurs, then its output is −1 on falling edges of Flip-flop 202 output and +1 on rising edges.

Figure 2B:
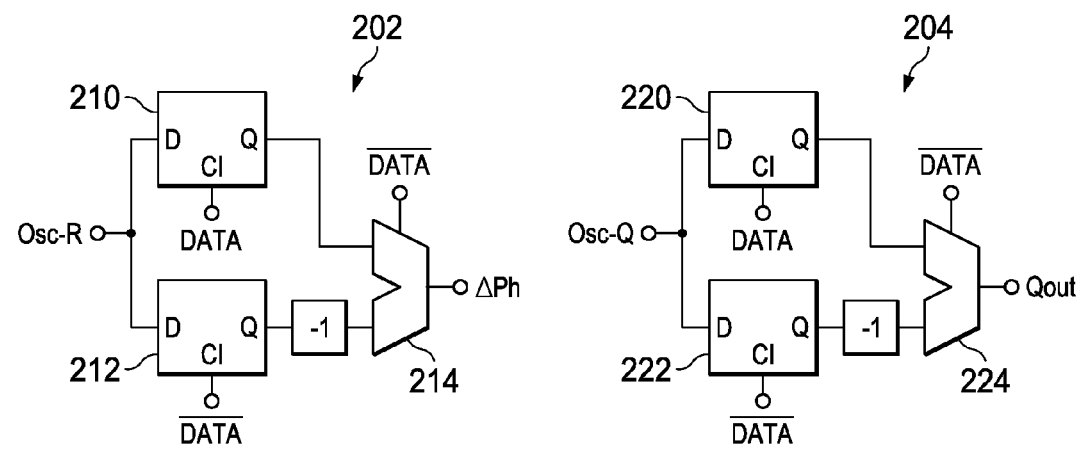

Pottbäcker PFD 200 requires that VCO 152 have a quadrature output. As shown in FIG. 2B, flip-flops 202, 204 each use parallel clocked latches, i.e., latches 210, 212 for flip-flop 202 and latches 220, 222 for flip-flop 204. Each flip-flop has a respective Mux 214, 224 at output to sample on transitions only and eliminate a dependency on the sign of the data. The mux connects the output of the latch in 'hold' to the overall output. Qout of the second flip-flop is normally always a '1' when the system is locked. When the system is not locked, this signal is used to help realize a 'nice' frequency detector. When VCO 152 is not in frequency lock, the outputs of the two lip-flops 202, 204 are in quadrature phase at a frequency equal to the difference in frequency between the oscillator and data input, assuming a maximum transition density. In the Pottbäcker frequency-detector, the output of Flip-flop 204 is sampled at each transition of Flip-flop 202. The sign of the quadrature output decides whether to 'pump-up' the loop filter or 'pump-down' the loop filter. When in lock, there are no transitions on flip-flop 202, and therefore no pump-up or pump-down signals caused by the frequency detector.

Figure 3:
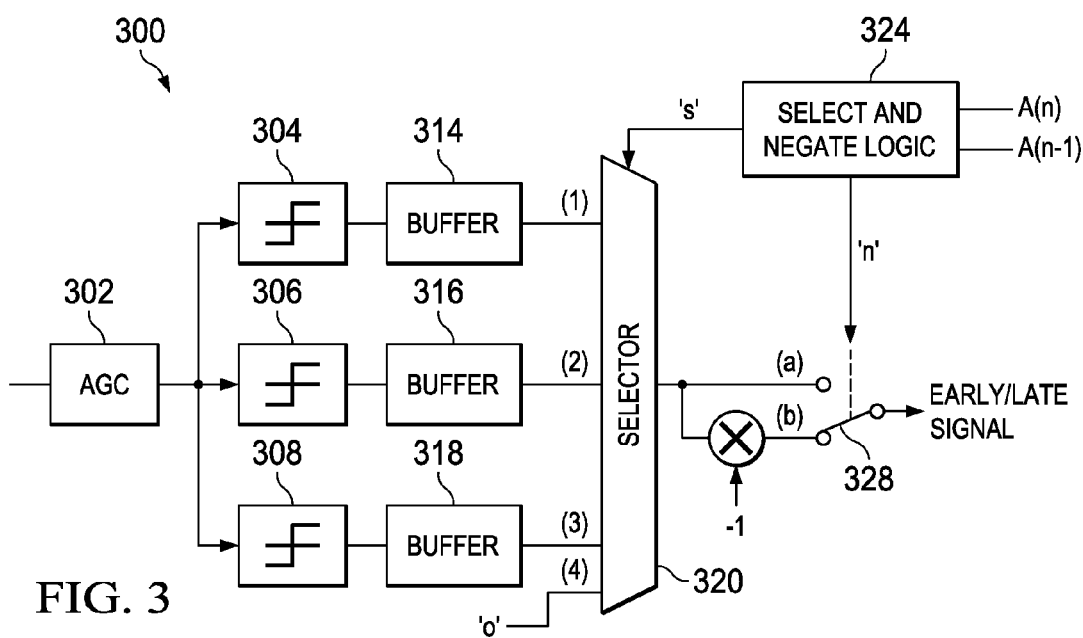
FIG. 3 depicts an example of a PAMPD that can be used in an embodiment of the disclosure.

We turn next to the PAMPD, but before we do, it is notable that data input to Pottbäcker PFD 200 is drawn from a point prior to DFE 114, i.e., data signal 138 is input to Pottbäcker PFD 200 after equalization by CTLE 110 and amplification by VGA 112, but without correction of the ISI by DFE 114. In contrast, PAMPD 140 receives data signal 148 that is taken from the other side of adder 122 and thus has received the benefit of post-cursor ISI correction from FIR/IIR DFE feedback 120. PAMPD 140 also receives output signal 158 of DFE 114, which after adaptation will provide recognized data. FIG. 1 provides a high-level view of PAMPD 140 as containing multiple error slicers 142 and early/late module 144; while circuit 300 of FIG. 3 provides an example of an implementation of PAMPD 140. The data detected by error slicers 302, 304, 306 of PAMPD 140 are used to detect transition in the data by looking at the currently detected data and the previously detected data. Out of the possible PAM4 data transitions, a subset that is valid or exploitable will be considered. Depending on an exploitable data transition, one of the error slicers output will be selected to provide an indication whether the current clock is slow or fast. Also depending on the data transition, the selected error slicer value may be negated. The clock used for sampling the error slicers is in 90 degree phase difference with the clock used to sample the data slicers used in data recognition.

In the implementation of FIG. 3, automatic gain control (AGC) circuit 302 receives and gain adjusts a PAM4 input signal. This signal is provided to selector 320 via three circuits. A first circuit contains error slicer 304 connected in series with buffer 314 and provides signal (1) to selector 320; a second circuit contains error slicer 306 connected in series with buffer 316 and provides signal (2) to selector 320; and a third circuit contains error slicer 308 connected in series with buffer 318 and provides signal (3) to selector 320. Each of error slicers 304, 306, 308 compares the signal to a respective reference voltage, not specifically shown, and provides a binary output of either −1 or +1 to indicate whether or not the current signal is greater or less than the respective reference voltage. In a PAM4 system in which the signals have values of −1, −⅓, +⅓, and +1 volts, the reference voltages can be, for example, −⅔ volts for error slicer 304, 0 volts for error slicer 306, and +⅔ volts for error slicer 308. Selector 320 receives signals (1), (2), and (3) from error slicers 304, 306, 308, as well as a signal (4) that has a constant value of 0. Select and negate logic 324 receives signals providing the current detected data A(n) and the previous detected data A(n−1) from DFE module 114 and provides a select signal, 's', that provides an appropriate selection to selector 320 and a negate signal, "n", to switch 328. The output of selector 320 will be one of −1, 0 and +1; this signal is provided to switch 328 as signal (a) and this same signal is multiplied by −1 to provide its negative value as signal (b).

The following table provides a correlation between the values, A(n−1) and A(n), received by select and negate logic 324 and the signals "s" and "n" output by this module. When A(n−1) and A(n) are different, a transition has occurred; the phase detector will determine whether the transition is early or late depending on the value of the selected signal and whether the signal value (a) is used or its negative value (b) is used; "x" means that selection of (a) of (b) does not matter.

TABLE 1

| A(n−1) | A(n) | s | n |
|---|---|---|---|
| −1 | −1 | 4 | x |
| −1 | −1/3 | 4 | x |
| −1 | 1/3 | 1 | b |
| −1 | 1 | 2 | b |
| −1/3 | −1 | 4 | x |
| −1/3 | −1/3 | 4 | x |
| −1/3 | 1/3 | 2 | b |
| −1/3 | 1 | 3 | b |
| 1/3 | −1 | 1 | a |
| 1/3 | −1/3 | 2 | a |
| 1/3 | 1/3 | 4 | x |
| 1/3 | 1 | 4 | x |
| 1 | −1 | 2 | a |
| 1 | −1/3 | 3 | a |
| 1 | 1/3 | 4 | x |
| 1 | 1 | 4 | x |

The output of switch 328 is provided as an early/late signal to a charge pump, not specifically shown, which controls the voltage controlled oscillator 152 providing the clock signal.

Figure 4:
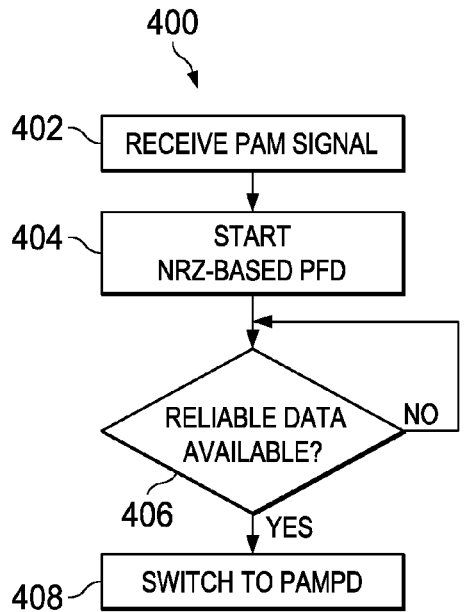
FIG. 4 depicts a flowchart for shifting from Pottbäcker PFD to PAMPD according to an embodiment of the disclosure.

It is noted that existing solutions for reference-less clock operation generally use either Pottbäcker or a variation thereof, and use this NRZ based PFD for both frequency acquisition and steady state phase tracking. While this solution is acceptable for binary signals, the performance with multilevel signals suffers due to inefficient phase tracking by NRZ-based PFD, causing an excessive amount of clock jitter. The disclosed solution is to treat acquisition and tracking phases differently by switching operations to PAMPD in the tracking phase. This operation is illustrated in FIG. 4. Method 400 begins with CDR 118 receiving a PAM signal (402). As soon as this occurs, Pottbäcker PFD 130 is started (404). On startup, CDR bandwidth is opened up to achieve faster convergence on frequency acquisition. Once frequency lock is achieved, bandwidth is decreased in defined stages, with an arbitrary number of loop settings used to obtain both frequency and phase lock for the PAM signal. When a final stage with low bandwidth for low jitter phase tracking is achieved, the CDR is ready to replace the conventional Pottbäcker PFD 130 with PAMPD 140.

Although Pottbäcker PFD 130 does not require nor utilize decoded data, PAMPD 140 does require reliable decoded data. Therefore a determination must be made whether or not reliable data is available (406) for use by PAMPD 140, which requires a recognition that DFE convergence has occurred. One skilled in the art will recognize that it is possible to use any possible criteria for convergence of DFE adaptation, such as determining that the rate of change for the DFE coefficients has fallen below a given threshold. In at least one embodiment, after convergence of the DFE adaptation, CDR 118 waits a predetermined time, e.g. 'N' Unit Intervals (UIs), with typically N≥1000. In at least one alternate embodiment, after convergence of the DFE adaptation, eye-monitoring is started in which one or more error slicers are used to measure the eye-height. The determination of the availability of valid data is then made when the vertical eye-opening for a given symbol error rate (SER) is above a pre-determined threshold. A typical value for SER can be $10^{-3}$ and the eye-opening can be 50% or less of the maximum opening. Once CDR 118 makes the determination that reliable data is available, a switch is made (408) to PAMPD 140. PAMPD 140 is more reliable than Pottbäcker and has better tracking performance as it is using decoded data provided by DFE 114 or by any high performance decision scheme. Use of PAMPD 140 can also allow the receiver to operate under more severe channel conditions where NRZ based PFD fails due to its excessive amount of timing jitter.

CTLE Gear Shifting

Existing CTLE equalizers typically use a single CTLE setting for both frequency locking and steady state data detection phases. Such an approach is only possible if the initial frequency difference between the transmitter and receiver is small and there is less emphasis on the equalization performed by DFE. However, when there is a strong emphasis on DFE equalization, e.g., by using an Infinite Impulse Response (IIR) DFE, a single CTLE setting will become inefficient for one or both of the two phases of operation. This situation can arise, for example, with PAM signals that become difficult to interpret after traversing a length of cable. In this instance, it is desirable to have very strong equalization from CTLE 500 while a frequency lock is acquired. However, once the frequency is locked, DFE equalization is used to provide additional equalization that CTLE 500 is unable to provide. When CTLE 500 is working in conjunction with a DFE, a very different CTLE setting is desirable. An example of a receiver for such a scenario is shown in system 100 of FIG. 1. In this figure, CDR 118 extracts clock frequency from the incoming received signal using VCO 152 in a PLL. CDR 118 needs to lock frequency and phase initially so that receiver 100 can detect PAM signals. Frequency locking in this instance will fail if the "eye" of the incoming signal is closed; achieving a locking condition is worse when DFE and IIR DFE is needed. That is, a strong equalization like DFE and its IIR version is usually utilized under harsh channel conditions where excessive amount of ISI is present; any form of CTLE equalization will not be enough to clean up the ISI in these conditions. However, simulation shows that a minimally open eye can achieve frequency lock. The disclosed gear shifting method and device allow over-equalizing with maximum CTLE setting on startup to achieve frequency and phase lock, followed by a gradual adaptation to the optimal setting for overall performance. An example CTLE equalizer is discussed below, followed by a discussion of the disclosed method.

Figure 5A:
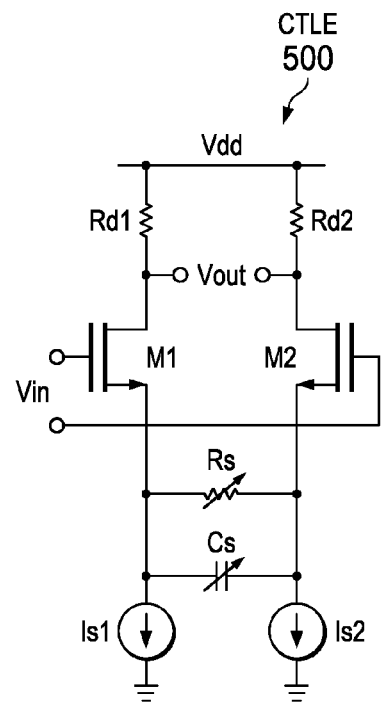
FIG. 5A depicts an example of a CTLE that can be used according to an embodiment of the disclosure.
Figure 5B:
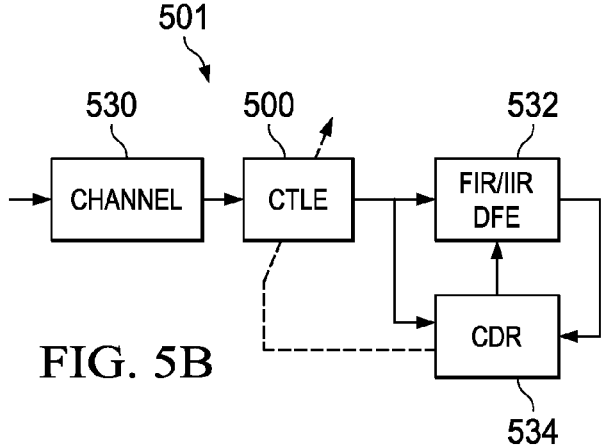
FIG. 5B depicts an example relationship between a CTLE, CDR and DFE according to an embodiment of the disclosure.

System 501 of FIG. 5B is a simplified version of FIG. 1 and illustrates the relationship of Continuous Time Linear Equalizer (CTLE) 500 to other elements in the system. CTLE 500 receives an incoming signal via channel 530 and feeds that signal, after equalization, to both FIR/IIR DFE 532 and CDR 534. Additionally, CTLE 500 receives a control signal from CDR 534 as will be explained further herein. CTLE is an analog, i.e., continuous time, filter that is usually composed of several stages. FIG. 5A provides an example embodiment of CTLE 500, showing only a single stage. It will be understood that the disclosed CTLE is shown only as an example and that other configurations of the CLTE can be used and further that multiple stages of CTLE 500 can be used. In at least one embodiment, CTLE includes four stages. Other embodiments can include more or fewer stages.

FIG. 5A depicts a CTLE circuit 500 in accordance with an embodiment of the invention. As depicted, the CTLE circuit 500 can include two drain resistors Rd1 and Rd2, transistors M1 and M2, a variable source resistor Rs, a variable source capacitor Cs, and two source current sinks Is1 and Is2. The drain resistor Rd1 may be connected between the drain of transistor M1 and voltage source Vdd, and the drain resistor Rd2 may be connected between the drain of transistor M2 and voltage source Vdd. The current sink Is1 may be connected between the source of transistor M1 and ground, and the current sink Is2 may be connected between the source of transistor M2 and ground.

The differential input signal Vin is provided to the gates of the transistors M1 and M2, and the differential output signal Vout is generated at two output nodes, where a first output node is between the drain of transistor M1 and drain resistor Rd1, and a second output node is between the drain of transistor M2 and the drain resistor Rd2. The source capacitor Cs, which can be a variable capacitor, and the source resistor Rs, which can be a variable resistor, can be connected in a parallel manner between the sources of the two transistors M1 and M2. The source capacitor Cs functions as a peaking capacitor that may be used to adjust the amount of gain produced at the resonant frequency. The source resistor Rs functions as a source degeneration resistor that may be used to adjust a low-frequency gain of the CTLE circuit 500. The variable versions of capacitor Cs and resistor Rs enable the adjustment of the frequency and gain characteristics of the circuit 400 for equalization purposes.

Each stage of the CTLE corresponds to a continuous time filter and is configurable to a predefined set of configuration settings. Each configuration setting corresponds to an instance of that stage parameters, such as the values of the resistors and capacitors used in its implementation, as well as the variables used for Rs and Cs. Such a setting will result in specific pole-zero locations of the filter and thus a certain frequency response. If the possible settings for a stage k of CTLE 500 is denoted by:

$$S_k = \{S_{k,1}, S_{k,2}, \ldots, S_{k,Nk}\},$$

where Nk is the possible number of settings for this stage, then the CTLE will be defined by a code:

$c=(c_1, c_2, \ldots, c_k)$ where $c_k$ is an element of $S_k$ for k=1, . . . K, and K is the number of CTLE stages. The total number of possible settings will be $N_1 \times N_2 \times \ldots \times N_K$. In an example 4-stage CTLE where each stage has 13 possible settings ranging from 0 to 12, the total number of CTLE settings will be $13^4$=28561. In at least one embodiment of the disclosure, a setting of (5, 5, 4, 4) was found to be appropriate for an initial setting optimized for CDR locking and (6, 6, 5, 5) was found to be suitable for a final setting for steady-state operation.

The disclosed initial and final equalization settings or "gears" have different boost values and boost frequencies. In at least one embodiment, CTLE 500 changes from the initial equalization settings to the final equalization settings through intermediate settings that gradually change the boost value and boost frequency from those of the initial equalization settings to those of the final equalization settings, which can allow other elements of the receiver to adjust along with the changing values of the CTLE settings. Prior to each step of changing the CTLE from one setting to the next, the receiver determines that the adaptation parts of the receiver, such as DFE and AGC adaptation, as well as the CDR, have settled down to their steady state. Additionally, prior to making the first change from an initial equalization setting to the first intermediate equalization setting, the receiver has to determine that frequency locking has been achieved. Any gear shifting through the trajectory of equalization settings, i.e., from initial equalization setting to intermediate equalization settings to final equalization setting, should not cause the CDR to lose frequency lock; otherwise the CTLE will have to return to the initial equalization setting and gear shifting has to start from the beginning again.

Figure 6:
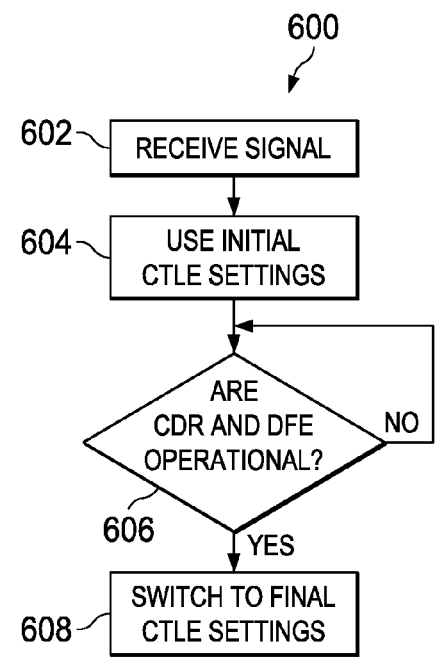
FIG. 6 depicts a flowchart for shifting the CTLE from an optimal setting for clock recovery to an optimal setting for operation with a DFE module according to an embodiment of the disclosure.

FIG. 6 depicts a method (600) for shifting the CTLE from an optimal setting for clock recovery to an optimal setting for operation with a DFE module according to an embodiment of the disclosure. It will be understood that this method can also be generalized to a method of shifting from an initial setting that is optimized for a first condition to a final setting that is optimized for a second condition. A receiver, such as receiver 100, receives a signal (602) via channel 530. CTLE 500 begins operations using the initial CTLE settings (604), which are optimized for use in acquiring frequency lock, i.e., a first condition. In at least one embodiment, this initial setting provides over-equalization of the signal in order to open the eye as much as possible for frequency lock. Once frequency lock has been achieved, CDR 534 receives recognized data from FIR/IIR DFE 532 and is able to determine whether IIR is operational (606). In at least one embodiment, CTLE 500 remains in its initial setting until IIR is operational. Once that determination has been made, CTLE 500 switches to the final CTLE settings (608), which are optimized for steady state operation with a DFE, i.e., a second condition. As noted previously, this change can be made in a single step or can follow a known trajectory through predetermined intermediate steps, but generally occurs in a matter of microseconds. In at least one embodiment, a look-up table provides the initial, intermediate, and final settings for the CTLE 500.

IIR DFE Adaptation

Figure 7:
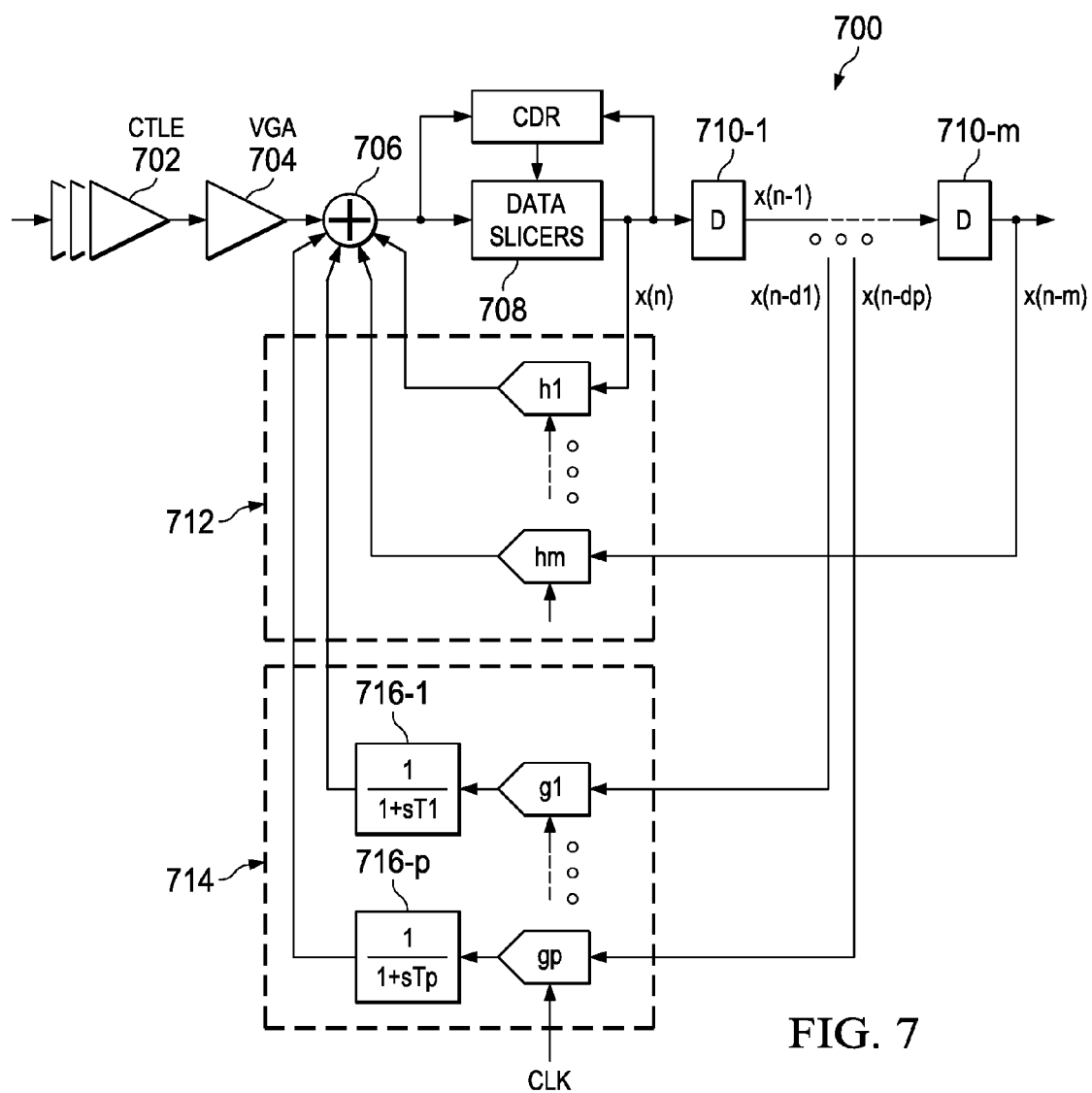
FIG. 7 depicts an example DFE using IIR according to an embodiment of the disclosure.

FIG. 7 depicts a typical receiver 700 employing IIR/DFE alongside conventional FIR/DFE. The received signal, after being processed by continuous time linear equalizer (CTLE) 702, undergoes decision feedback equalization (DFE). The signal from CTLE 702 passes through VGA 704 and adder 706 to data slicers 708, then moves through data delay line 710, which consists of digital delay blocks 710-1 through 710-*m* and corresponds to data buffer 126 in FIG. 1. Taps h1-*hm* are FIR taps, which removes a finite portion of ISI in the signal, and taps g1-*gp* are IIR taps, which removes an infinitely long duration of ISI in the signal by using infinite impulse response (IIR) filtering; each tap receives the signal from various points in data delay line 710. Each FIR tap h1-*hm* comprises a digital-to-analog converter (DAC) and applies a gain coefficient to the signal value at that point to correct known ISI. Each IIR tap comprises a DAC connected in series with a filter 716 between a point in delay line 710 and adder 706. The DAC g1-*gp* for each IIR tap applies a gain coefficient to the signal, while filter 716-1 through 716-*p*, applies a time constant to the signal. Filters 716-1 through 716-*p* are first-order filters that can be basically implemented by a simple resistor-capacitor (RC) charge/discharge mechanism. Each of the constituent filters in IIR DFE 714 generates an exponentially decaying signal that can be used to cancel a long smooth tail of interference caused by the previously transmitted symbols. The total of all corrections provided by FIR DFE 712 and IIR DFE 714 is subtracted from the signal received from CTLE 702 at adder 706.

In contrast to FIR/DFE 712, in which each tap cancels the interfering effect of one previously transmitted symbol on the current data, IIR/DFE 714 cancels the interfering effects of the same previous data on the current as well as the future upcoming data. This property renders the IIR version more efficient than the FIR version in terms of power and performance. Essentially, DFE subtracts a reconstructed copy of the signal related to the previously detected data using the feedback path that contains FIR filter 712 and IIR filter 714. In an example embodiment, three FIR taps are used and two IIR taps. Without the use of IIR taps, the same circuit using only FIR taps could require fifteen or more FIR taps. Accordingly, it is possible to use a less complex circuit with IIR DFE, as well as to provide power savings.

Figure 8:
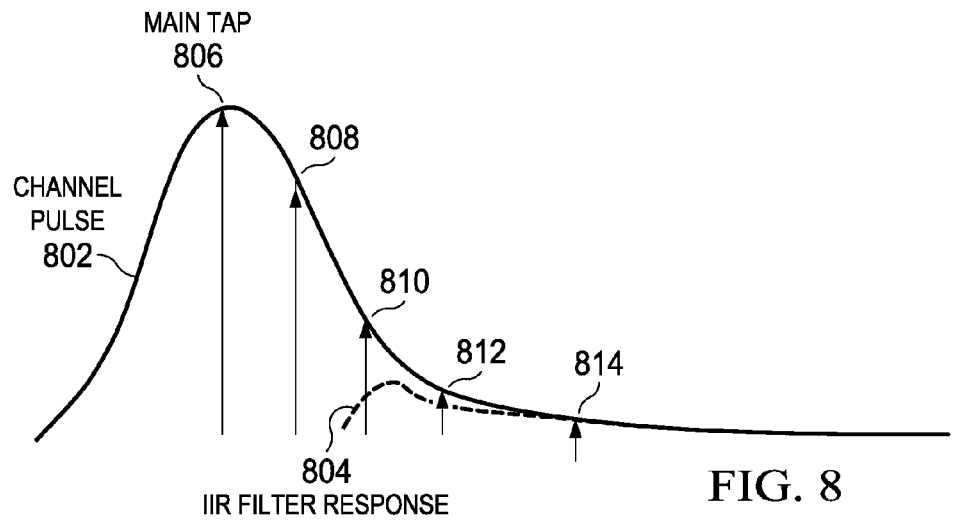
FIG. 8 depicts an example of adjustments that can be made to the signal using the various taps according to an embodiment of the disclosure.

One skilled in the art will recognize that the values of the gain g1-*gp* and of the time constant for 716-1 through 716-*p* need to be tuned or adapted over the time of signal reception. Curves 802 and 804 of FIG. 8 are used to illustrate the concept of IIR/DFE adaptation. The large curve 802 represents the effective pulse response of the communication channel, while the upright arrows 806, 808, 810, 812, 814 are spaced at one unit interval (UI), which is the time spent by a transmitter to send one data unit. Ideally we would like to have a rectangular channel pulse response at the receiver, with time duration limited to the spacing of two adjacent vertical arrows, as a channel pulse response with duration of more than one UI will cause interference on the adjacent data symbols. As seen in this figure channel pulse 802 is not only wide but has a slowly decaying tail that will cause a transmitted data pulse to interfere with a large number of the upcoming adjacent data. The tap at the highest point of curve 802 is considered the main tap 806. In an example embodiment, the next two taps 808, 810 represent FIR/DFE taps that align themselves to the non-exponential part of the channel pulse response. The IIR/DFE adaptation role is to fit a superposition of a limited number of exponentially decaying signals to the tail of this channel pulse response 802. The smaller curve 804 in this figure represents one of those exponential curves that after ramping up tries to closely follow the channel pulse response tail.

The disclosed adaptation uses digital delay line 710, which buffers the decoded data, and selects two types of taps from delay line 710. These taps are called the pivot tap and the monitor tap(s) and are used to create two degrees of freedom to adapt the gain and time constants needed for IIR DFE. A pivot tap 814 is used for gain adaptation for a specific IIR path of interest. Typically, a sign-sign LMS algorithm is used in this type of mixed signal adaptation due to implementation simplicity, with the gain updated in relation to the error correlation with the data at the selected pivot tap location. In effect, a pivot tap is treated identically as an FIR tap and the gain is adapted such that the IIR tail intersects the incoming channel pulse response at the location of pivot tap 814, as it is seen in FIG. 8. The pivot tap location is chosen depending on the time constant to be achieved. For adaptation of small time constants, a pivot tap location will be selected early in the delay line. For large time constants, pivot tap will be towards the end of the delay line. Programmability can be achieved by adding a multiplexer, not specifically shown, after the delay line to allow the same adaptation structure to be used for different channels.

One or more monitor taps are then used to monitor the offset of the time constant for the IIR path of interest. In FIG. 8, one monitor tap 812 has been selected, although multiple monitor taps can be selected. The monitor taps are chosen to the left of the pivot taps as seen in this figure, since they provide more reliable error information due to the nature of the exponential decays. If the time constant is too large, the monitor taps will yield a negative error-data correlation once the pivot tap error has settled; if the time constant is too small, a positive error-data correlation on monitor taps will be observed. Another simple LMS update equation on monitor tap 812 can be then used to adapt the time constant. To further improve the reliability of the monitor information, a weight function can be applied to the selected monitor tap group. The weight function can be arbitrarily designed for best performance, but a simple linear weighting can give good performance.

The disclosed adaptation scheme does not limit the number of IIR paths that can be used in the system. Most channels exhibit more than two distinct time constants. By choosing multiple pivot tap locations and corresponding monitor taps accordingly, we can adapt for any required number of IIR paths. To reduce the interference between different IIR paths during adaptation, one can provide reasonable initial conditions given channel knowledge. It is also desirable to alternate between the adaptations of various IIR paths of interest to realize a one-at-a-time adaptation scheme. In at least one embodiment, better adaptation performance can be achieved by starting to tune the IIR tap with shortest time constant first, then moving to the second shortest and so on. In at least one other embodiment, the adaptation can start tuning the IIR tap with the longest time constant first, then moving to the next longest, etc. Other sequences of adaptation can also be used. In the disclosed scenario, no training sequence needed for adaptation. The output of data slicers 708 is correlated with detected data to provide the correction for pivot and monitor taps. Once DFE 714 has reached steady state, the adaptation process can be run at a much slower rate. For example, when IIR DFE process is initiated for a signal, a short adaptation period can be set, so that a rotation among the various IIR paths of interest occurs once the adjustment to each path of interest has had time to settle. After steady state is reached, a longer time period can be used between adjustments to the various paths.

The disclosed adaptation scheme includes the following actions, which are shown in methods 900A and 900B of FIGS. 9A and 9B. Method 900A illustrates the design and implementation phase, which begins by using known factors, such as the expected channel characteristics, type of application, cable length and other related conditions, to select pivot tap and monitor tap locations for the desired time constants (902). The following actions will be taken for each IIR path of interest and therefore begin by selecting a given IIR path of interest (904). In at least one embodiment, the method starts with the path having the longest time constant. The method continues by selecting the pivot and monitor taps for a given IIR path of interest (906). For the current IIR path of interest, the method correlates the error signal and the buffered decoded data in the delay line at the chosen pivot and monitor locations (908). If necessary, a weighting function can be applied to the monitor tap group (910). Likewise, window averaging and/or filtering can be applied on the error-data correlations if needed (912). Method 900A then determines whether there are additional IIR paths of interest (914). If there are, actions 904-912 are repeated for each IIR path of interest until all paths have been determined.

Once in service, method 900B depicts the adaptation process. Method 900B begins when the DFE module begins operation (920). An IIR path of interest is selected (922). The gain for this path is updated using the pivot tap error data correlation as noted above (924). The time constant for this path is also updated using the monitor tap(s) error-data correlation (926). Both adaptation algorithms use versions of LMS to update the values. Method 900B determines whether a given period of time, i.e., the adaptation period, has passed (928) to allow the signal to settle from changes. If not, method 900B continues to wait until the adaptation period has passed. Once this time has passed, the method selects the next IIR path of interest and returns to the flowchart at (904).

In one implementation example, the channel under operation requires IIR cancellation paths with time constants of 5× and 20× the unit interval. IIR DFE and the disclosed adaptation can work jointly with existing FIR DFE solutions. The example system has FIR taps corresponding to the first three strong post cursor ISI. Pivot tap locations at 7 and 18 in the delay line are used. For the small time constant (5×UI) adaptation, taps 4-6 are used with a linear weighting as its monitor taps. Tap 15 is picked as the monitor tap for the large time constant (20×UI). Window averaging on the monitor tap error correlations are further applied for better convergence behavior. The adaptation alternates between these 2 IIR paths, i.e. we adapt the larger time constant first, then the smaller time constant, and repeat.

In conclusion, the disclosed IIR DFE uses the concept of pivot and monitor taps to decouple the gain and time constant adaptation. The delay line provides enough degree of freedom for the adaptation to use the best pivot and monitor taps for a given channel. This selection only requires a simple multiplexer in the digital domain, which in today's scaled CMOS process requires little overhead. This adaptation method can be jointly used with FIR DFE and allows multiple time constants in the IIR DFE path. Update equations are simple conventional LMS equations and modifications can be applied for better performance.

Figure 10:
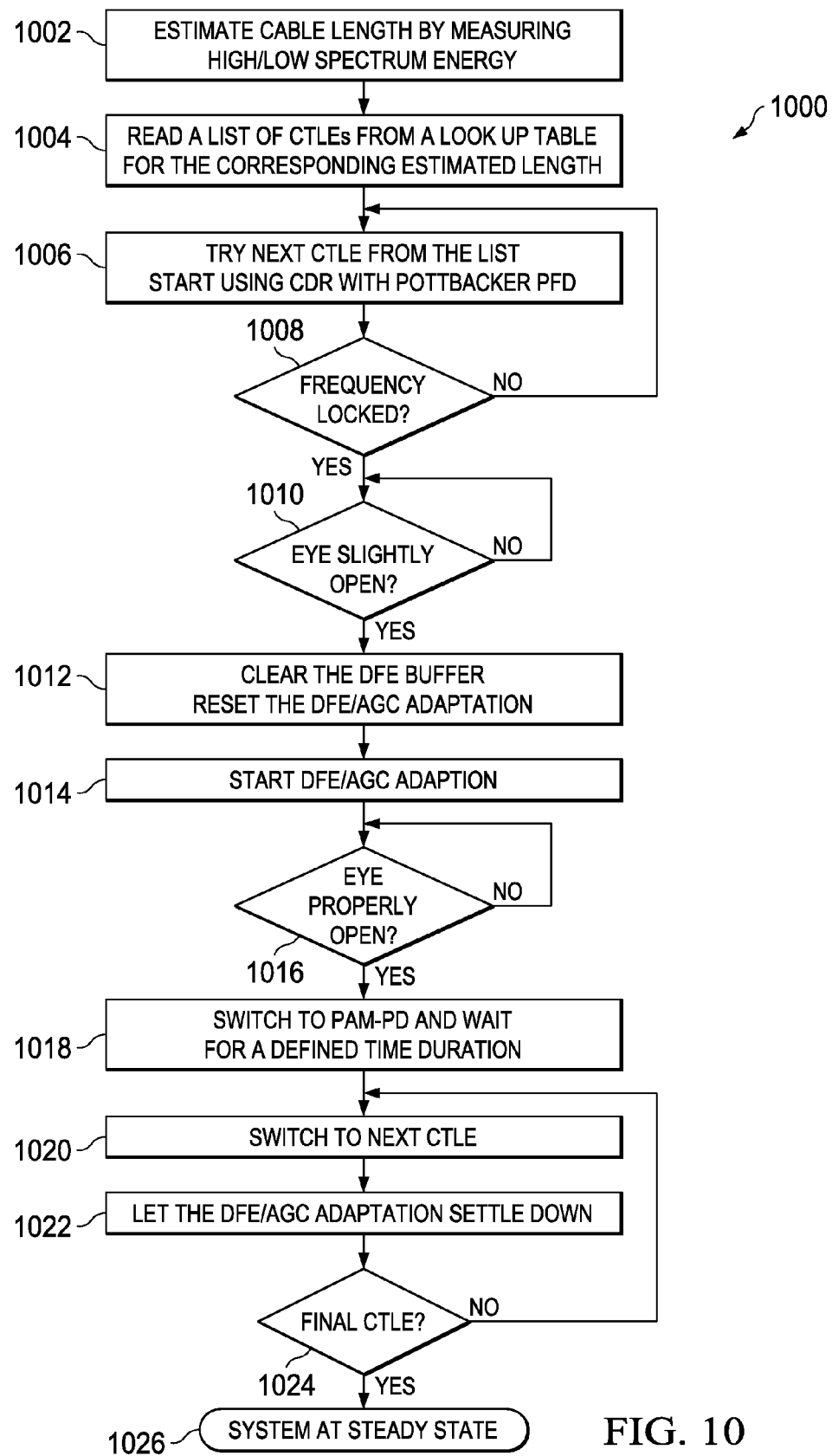
FIG. 10 depicts an overall flowchart for startup of the receiver architecture shown in FIG. 1 according to an embodiment of the disclosure.

As has been noted previously, the disclosed CTLE, CDR and IIR DFE modules are operable in configurations other than the system disclosed in FIG. 1. However, an example of the process of using the module of FIG. 1 is shown in FIG. 10. Method 1000 begins with the system estimating the cable length by measuring the high/low spectrum energy (1002). The system reads a list of CTLE settings from a look-up table for the corresponding estimated length (1004). A first CRLE setting is used and CDR is started using the Pottbäcker PFD 130 (1006). After a given time, the method determines whether a frequency lock has been obtained (1008). If not, a next CTLE from the loop-up table is selected and the process continues (1006). Once a frequency lock has been obtained, the method determines whether the eye is slightly open (1010). If not, the process continues to wait. Once the eye is slightly open, the process clears the DFE buffer and resets the DFE/AGC adaptation (1012), then starts DFEAGC adaptation (1014). The process then determines whether the eye has been properly opened (1016) and will wait until this condition has been met. Once the eye is open, the process switches to PAM-PD 140 and waits a defined time duration (1018). The process then begins switching to the final CTLE setting by switching to a next CTLE setting (1020). The process allows the DFE/AGC adaptation to settle down (1022) before determining whether the final CTLE setting has been reached (1024). If not, the process switches to the next CTLE setting (1020) and again allows the DFE/AGC adaptation to settle down (1022). Once the final CTLE setting has been reached, the system is at steady state (1026).

Although various embodiments have been shown and described in detail, the claims are not limited to any particular embodiment or example. Further, none of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for providing clock data recovery (CDR) in a receiver, the method comprising:
   receiving a Phase Amplitude Modulation (PAM) signal;
   on startup, using a non-return-to-zero (NRZ)-based phase frequency detector (PFD) to acquire a frequency from the received PAM signal; and
   responsive to a determination, switching to a PAM phase detector (PD) for steady state operation of the CDR module;
   receiving at the NRZ-based PFD a first signal that comprises the received PAM signal after amplification and equalization using a continuous time linear filter;
   receiving at the PAM PD a second signal that comprises the first signal summed with a correction provided by a Decision Feedback Equalizer (DFE); and
   receiving at the PAM PD a third signal that comprises PAM data output from the DFE.

2. The method as recited in claim 1 further comprising making the determination after convergence of a decision feedback equalizer (DFE).

3. A method for providing clock data recovery (CDR) in a receiver, the method comprising:
   receiving a Phase Amplitude Modulation (PAM) signal;
   on startup, using a non-return-to-zero (NRZ)-based phase frequency detector (PFD) to acquire a frequency from the received PAM signal; and
   responsive to a determination, switching to a PAM phase detector (PD) for steady state operation of the CDR module; and
   making the determination responsive to detecting that a fixed time has elapsed since Decision Feedback Equalizer (DFE) convergence;
   wherein the fixed time is greater than or equal to a given number of unit intervals (UI) of the received signal.

4. A method for providing clock data recovery (CDR) in a receiver, the method comprising:
   receiving a Phase Amplitude Modulation (PAM) signal;
   on startup, using a non-return-to-zero (NRZ)-based phase frequency detector (PFD) to acquire a frequency from the received PAM signal; and
   responsive to a determination, switching to a PAM phase detector (PD) for steady state operation of the CDR module; and
   making the determination responsive to detecting that a vertical eye opening of the second signal for a given symbol error rate (SER) is above a specified threshold.

5. The method as recited in claim 4 wherein the SER is below $10^{-3}$ and the threshold is less than or equal to 50% of maximum eye opening.

6. A clock data recovery (CDR) module comprising:
   a non-return-to-zero (NRZ)-based phase frequency detector (PFD); and
   a PAM phase detector (PAMPD), wherein the CDR module initiates phase and frequency acquisition using the NRZ-based PFD and responsive to a determination, switches to PAMPD for steady state operation;
   wherein the NRZ-based PFD is connected to receive a first signal that comprises a received PAM signal that has been equalized by a linear equalizer and amplified by a voltage gain amplifier;
   wherein the PAMPD is further connected to receive a second signal that comprises the first signal summed with a correction provided by a decision feedback equalizer (DFE); and
   wherein the PAMPD is further connected to receive a third signal that comprises recognized PAM data output from the DFE.

7. The CDR module as recited in claim 6 wherein the determination is made after frequency locking.

8. The CDR module as recited in claim 7 wherein the determination is made after convergence of the DFE.

9. A clock data recovery (CDR) module comprising:
   a non-return-to-zero (NRZ)-based phase frequency detector (PFD); and
   a PAM phase detector (PAMPD), wherein the CDR module initiates phase and frequency acquisition using the NRZ-based PFD and responsive to a determination, switches to PAMPD for steady state operation;
   wherein the determination is made responsive to detecting that a fixed time has elapsed since DFE convergence; and
   wherein the fixed time is greater than or equal to a given number of unit intervals (UI) of the received signal.

10. A clock data recovery (CDR) module comprising:
    a non-return-to-zero (NRZ)-based phase frequency detector (PFD); and
    a PAM phase detector (PAMPD), wherein the CDR module initiates phase and frequency acquisition using the NRZ-based PFD and responsive to a determination, switches to PAMPD for steady state operation;
    wherein the determination is made responsive to detecting that a vertical eye opening of the second signal for a given symbol error rate (SER) is above a specified threshold.

11. The CDR module as recited in claim 10 wherein the SER is below $10^{-3}$ and the threshold is less than or equal to 50% of maximum eye opening.

12. A receiver comprising:
    a linear equalizer connected to provide a first signal, the first signal comprising a received PAM signal that has been equalized;
    a decision feedback equalizer (DFE) connected to receive the first signal and to provide a second signal and a third signal, the second signal comprising the first signal summed with a correction and the third signal comprising recognized PAM data; and a clock data recovery (CDR) module comprising a non-return-to-zero (NRZ)-based pulse frequency detector (PFD) and a PAM phase detector (PAMPD), the CDR module being connected to receive the first, second and third signals;

wherein the CDR module initiates phase and frequency acquisition using the NRZ-based PFD and responsive to a determination, switches to PAMPD for steady state operation.

* * * * *